United States Patent
Regunathan

(10) Patent No.: US 11,419,064 B2
(45) Date of Patent: Aug. 16, 2022

(54) GATEWAY MANAGED TERMINAL UPLINK POWER CONTROL

(71) Applicant: Murali Regunathan, Germantown, MD (US)

(72) Inventor: Murali Regunathan, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 245 days.

(21) Appl. No.: 16/507,468

(22) Filed: Jul. 10, 2019

(65) Prior Publication Data
US 2020/0344702 A1    Oct. 29, 2020

Related U.S. Application Data

(60) Provisional application No. 62/840,205, filed on Apr. 29, 2019.

(51) Int. Cl.
*H04B 7/185*    (2006.01)
*G01S 19/21*    (2010.01)
(Continued)

(52) U.S. Cl.
CPC ......... *H04W 52/346* (2013.01); *H04W 16/28* (2013.01); *H04W 52/146* (2013.01); *H04W 52/241* (2013.01); *H04W 72/046* (2013.01)

(58) Field of Classification Search
CPC . H04W 52/346; H04W 16/28; H04W 52/146; H04W 52/42; H04W 72/046;
(Continued)

(56) References Cited

U.S. PATENT DOCUMENTS 6,269,242 B1 *  7/2001  Leopold ............... H04B 7/2041
                                                    455/12.1
6,829,226 B1 * 12/2004  Apostolides ........ H04W 52/225
                                                    370/318
(Continued)

FOREIGN PATENT DOCUMENTS

EP    0972359 A1    1/2000
WO   9845962 A1   10/1998

OTHER PUBLICATIONS

Extended European Search Report for European Patent Application No. 20172195.8 dated Sep. 10, 2020.
(Continued)

*Primary Examiner* — Edan Orgad
*Assistant Examiner* — Vanneilian Lalchinthang
(74) *Attorney, Agent, or Firm* — Capitol City TechLaw; Jasbir Singh

(57) ABSTRACT

A system and method for managing a terminal uplink power, and a terminal having uplink power managed by a gateway are provided. The method including: dividing, at a gateway, a beam coverage area into sub-beams and each of the sub-beams into one or more frequency bins; associating a sub-beam of the sub-beams with terminals located within the sub-beam; determining Transmit Power (TP) values including a transmit power or attenuation for each of the one or more frequency bins of the sub-beam; sending, from the gateway, the TP values of the sub-beam to the terminals via a forward link; and receiving, at the gateway, a burst transmitted using a terminal transmit power calculated from the TP values of the sub-beam. The TP values may change in response to an SNR measurement at the gateway and/or feedback from the terminal.

21 Claims, 3 Drawing Sheets

(51) Int. Cl.
*H04Q 1/20* (2006.01)
*H04W 88/04* (2009.01)
*H04W 52/34* (2009.01)
*H04W 16/28* (2009.01)
*H04W 52/14* (2009.01)
*H04W 52/24* (2009.01)
*H04W 72/04* (2009.01)

(58) Field of Classification Search
CPC ............. H04W 52/225; H04W 52/226; H04W 52/241; H04W 52/243; H04B 7/18543; H04B 7/2656; H04B 7/18513; G01R 23/16; H04L 1/1692; G01S 19/21; H04K 3/22; H04K 3/42; H04K 3/822
USPC ........................................................ 370/318
See application file for complete search history.

(56) References Cited

U.S. PATENT DOCUMENTS

| | | | | |
|---|---|---|---|---|
| 8,483,609 | B2* | 7/2013 | Miller | H04B 7/18513 455/13.4 |
| 2003/0040274 | A1* | 2/2003 | Dai | H04B 7/18543 455/13.4 |
| 2005/0118947 | A1* | 6/2005 | Ames | H04B 7/18515 455/12.1 |
| 2008/0242339 | A1* | 10/2008 | Anderson | H04W 52/16 455/522 |
| 2011/0032866 | A1* | 2/2011 | Leabman | H01Q 3/2605 370/316 |
| 2015/0351043 | A1* | 12/2015 | De Gaudenzi | H04B 7/216 370/329 |
| 2016/0302207 | A1* | 10/2016 | Vasavada | H04W 52/50 |
| 2016/0315693 | A1* | 10/2016 | Richardson | H04B 7/18582 |
| 2017/0261615 | A1* | 9/2017 | Ying | H04K 3/90 |
| 2018/0288772 | A1* | 10/2018 | Liu | H04W 72/042 |
| 2020/0119808 | A1* | 4/2020 | Parr | H04L 1/1692 |
| 2020/0359419 | A1* | 11/2020 | Liberg | H04W 52/245 |

OTHER PUBLICATIONS

Intel Corporation: "On QoS Management for NR V2X Communication", 3GPP Draft; R1-1810780 Intel-EV2X QoS, 3rd Generation Partnership Project I3GPP), Mobile Competence Centre ; 650, Route Des Lucioles ; F-06921 Sophia-Antipolis Cedex; France, vol. RAN WG1, No. Chengdu China Sep. 29, 2018 (Sep. 29, 2018), XP051518185, Retrieved from: URL:http://www.3gpp.org/ftp/tsg%SFran/WG1%5FRL1/TSGR1%5F94b/Docs/R1%2D1810780%2Ezip [retrieved on Dec. 11, 2018] * section 4.1.3; p. 5-p. 6 *.

* cited by examiner

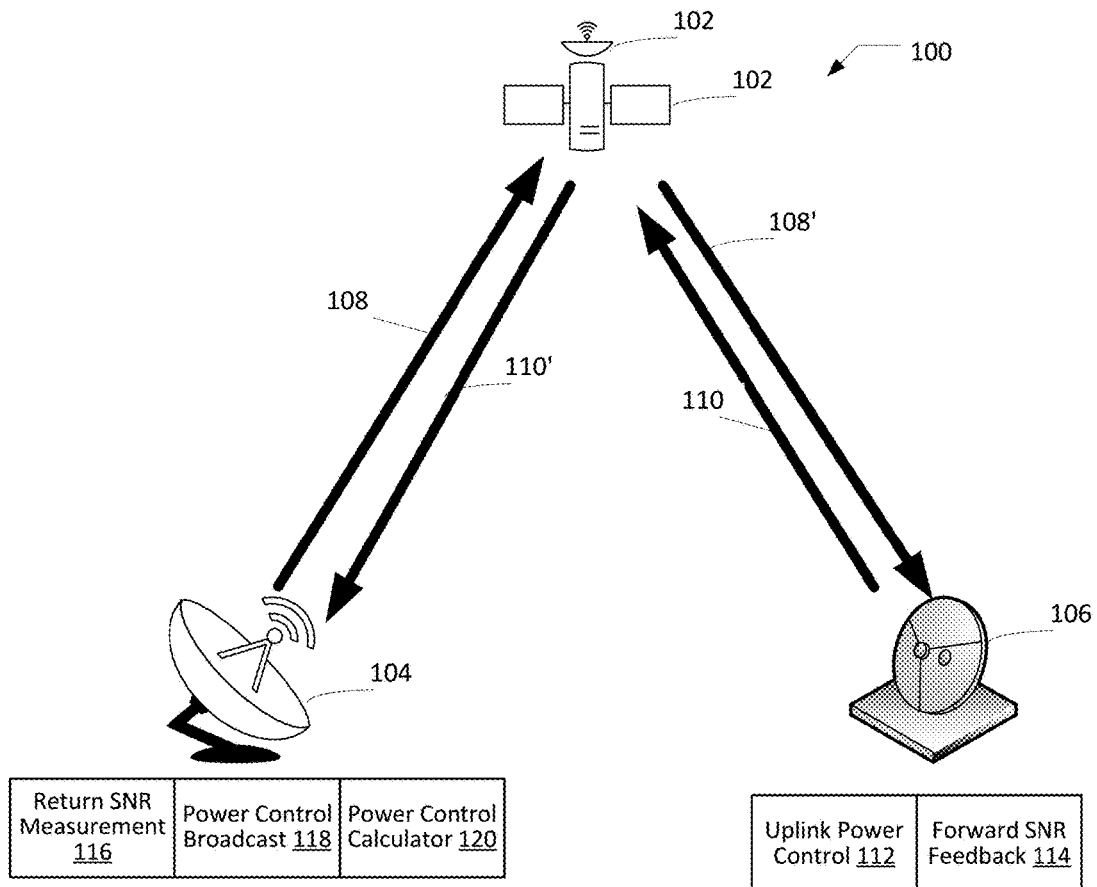
FIG. 1
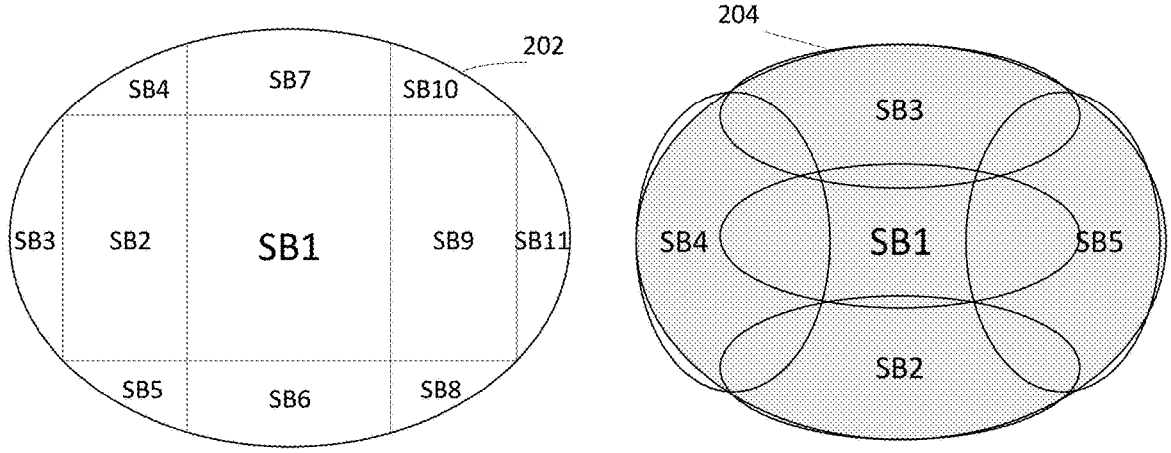
FIG. 2A
FIG. 2B

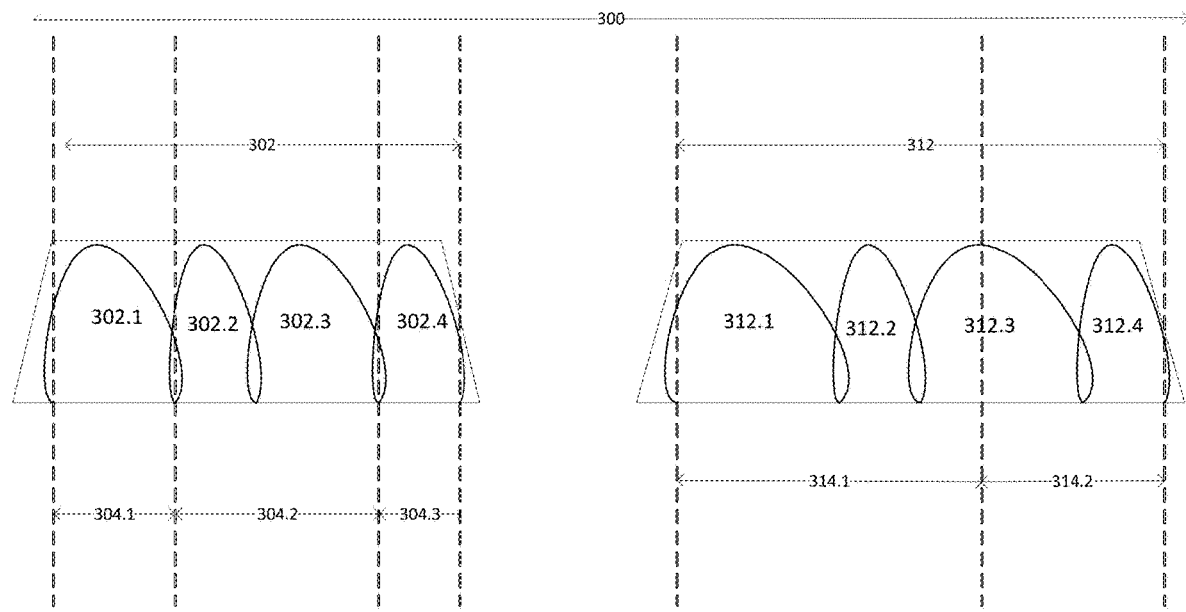
FIG. 3
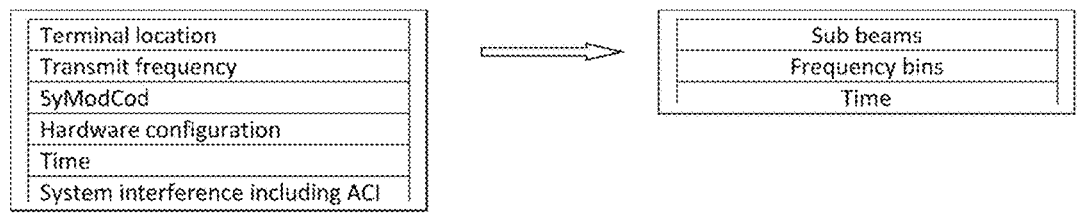
FIG. 4
| Sub beam | Frequency bin | Transmit Power Attenuation | Confidence metric |
|---|---|---|---|
| 1 | 1 | | |
| 1 | 2 | | |
| ... | ... | | |
| 1 | a | | |
| 2 | 1 | | |
| 2 | 2 | | |
| ... | ... | | |
| 2 | a | | |
| ... | ... | | |
| m | 1 | | |
| m | a | | |
FIG. 5

GATEWAY MANAGED TERMINAL UPLINK POWER CONTROL

CROSS REFERENCE TO RELATED APPLICATIONS

The present application claims the benefit of U.S. Provisional Application No. 62/840,205 filed Apr. 29, 2019, the contents of which are incorporated herein in its entirety.

FIELD

A system and method for periodically recommending power values for transmit or uplink power control for a terminal based on a location and transmission frequency, where the recommendations are provided using sub-beams and frequency-bins within sub-beams of a beam without feedback at startup. In some embodiments, a feedback may be used subsequent to startup to determine transmit power values.

BACKGROUND

The present disclosure alleviates problems with ranging to determine transmit power for a terminal. Exemplary problems include bandwidth allocation, time consumed, and ACI problems during mass re-ranging events. The present teachings eliminate the ranging process. A sudden change in the variables that affect the transmit power required, such as, changing of frequency (inroute sets), changing of locations (mobile), gateway switching (inclement weather, diversity, etc.), or the like A need for countering frequency varying system interference is also reduced substantially and the need for a separate Interference Compensation is reduced or eliminated.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings improve how terminal uplink power control is performed. A gateway may periodically recommend transmit power values to use for a terminal based on its location, and frequency of operation. The terminal may use these values for transmitting. In some embodiments minor adjustments to the gateway recommended transmit power values may be made prior to transmitting. These values may be adapted by the gateway over time to mirror varying atmospheric conditions. The adaptation may be performed constantly at a set interval. The gateway may initially use link budget calculations to calculate transmit power values. These values may then be adjusted by the transmit power values used by the terminals. A confidence metric may be provided to the terminals with the power values to help the terminal decide how to use the values.

The present teachings reduce an impact of a sudden change in the variables that affect the transmit power required. Variables that can affect the transmit power may include changing of frequency (inroute sets), changing of locations (mobile), GW diversity switching, or the like. The need for countering frequency varying system interference may also be reduced substantially (no separate Interference Compensation required).

A system of one or more computers can be configured to perform operations or actions by virtue of having software, firmware, hardware, or a combination of them installed on the system that in operation causes or cause the system to perform the actions. One or more computer programs can be configured to perform operations or actions by virtue of including instructions that, when executed by data processing apparatus, cause the apparatus to perform the actions. One general aspect includes a method for managing a terminal's uplink power, the method including: dividing, at a gateway, a beam coverage area into sub-beams and each of the sub-beams' available spectrum into one or more frequency bins; associating a sub-beam of the sub-beams with terminals located within the sub-beam; determining Transmit Power (TP) values including a confidence metric and a transmit power or attenuation for each of the one or more frequency bins of the sub-beam; sending, from the gateway, the TP values of the sub-beam to the terminals via a forward link; and receiving, at the gateway, a burst transmitted using a terminal transmit power calculated from the TP values of the sub-beam. Other embodiments of this aspect include corresponding computer systems, apparatus, and computer programs recorded on one or more computer storage devices, each configured to perform the actions of the methods.

Implementations may include one or more of the following features. The method where the TP values further include one or more of a confidence metric for each of the one or more frequency bins. The method where the determining of the TP values is based on a link budget calculation for each of the one or more frequency bins. The method further including adapting, based on a clustering of terminals in the sub-beams, a count of the sub-beams and the sub-beams within the beam coverage area; and calculating the TP values for the adapted sub-beams. The method further including adapting, based on a clustering of bursts in the one or more frequency bins, a count of the one or more frequency bins and a spectrum of each of the one or more frequency bins; and calculating the TP values for the adapted one or more frequency bins of the sub-beam. The method further including adjusting, at each of the terminals, the TP values for a respective frequency bin to account for a difference in a terminal amplifier power at a transmit frequency as compared to a center frequency of the respective frequency bin. The method further including adjusting, at a respective terminal, the TP values based on a difference between an average forward SNR at the gateway and a forward SNR of the respective terminal. The method further including dynamically calculating the TP values of the sub-beam. The method further including measuring a received Signal to Noise Ratio (SNR) of the burst, where the calculating alters the TP values of the sub-beam such that the received SNR approaches a desired SNR. The method where the burst includes a value for the terminal transmit power for a respective frequency bin from one of the terminals upon a change in the value, and the calculating alters the TP values of the sub-beam based on the value. The method where the calculating of the TP values includes one or more of normalizing, averaging or calculating an exponential moving average based on the value for one of the one or more frequency bins. Implementations of the described techniques may include hardware, a method or process, or computer software on a computer-accessible medium.

One general aspect includes a system to manage a terminal's uplink power, the system including: terminals; and a power control calculator module. The power control calculator module may divide a beam coverage area into sub-beams and each of the sub-beams into one or more frequency bins. The power control calculator module may associate a sub-beam of the sub-beams with terminals located within the sub-beam. The power control calculator module may determine TP values including a confidence metric and a transmit power or attenuation for each of the one or more frequency bins of the sub-beam. The system also includes a power control broadcast module to send the TP values of the sub-beam to the terminals via a forward link. The system also includes a gateway to receive a burst transmitted from one of the terminals using a terminal transmit power calculated from the TP values of the sub-beam. Other embodiments of this aspect include corresponding computer systems, apparatus, and computer programs recorded on one or more computer storage devices, each configured to perform the actions of the methods.

Implementations may include one or more of the following features. The system where the TP values further include one or more of a confidence metric for each of the one or more frequency bins. The system where the power control calculator module is configured to adapt, based on a clustering of terminals in the sub-beams, a count of the sub-beams and the sub-beams within the beam coverage area, and is configured to calculate the TP values for the adapted sub-beams. The system where the power control calculator module is configured to adapt, based on a clustering of bursts in the one or more frequency bins, a count of the one or more frequency bins and a spectrum of each of the one or more frequency bins, and is configured to calculate the TP values for the adapted one or more frequency bins of the sub-beam. The system where one of the terminals includes an uplink power control module to adjust the TP values for a respective frequency bin to account for a difference in a terminal amplifier power at a transmit frequency as compared to a center frequency of the respective frequency bin. The system where one of the terminals includes an uplink power control module to adjust the TP values based on a difference between an average forward SNR at the gateway and a forward SNR of the respective terminal. The system further includes a SNR measurement module to measure a received SNR of the burst, and the power control calculator module is configured to alter the TP values of the sub-beam such that the received SNR approaches a desired SNR. The power control calculator module is configured to alter the TP values of the sub-beam based on a terminal transmit power sent from the terminal. The system where the power control calculator module is configured to calculate the TP values using one or more of normalizing, averaging or calculating an exponential moving average as the terminal transmit power is received for one of the one or more frequency bins.

One general aspect includes a terminal having uplink power managed by a gateway, the terminal including an uplink power control module to receive, via a forward link, information including transmit power (TP) values including a confidence metric and a transmit power or attenuation for a sub-beam, frequency bins including a frequency range, a sub-beam associated with the terminal, and an average forward SNR value at the gateway. The uplink power control module also adjusts, based on the information, a terminal transmit power calculated from the TP values of the sub-beam. The terminal also includes a transmitter to transmit a burst via a return link to a gateway using the terminal transmit.

Implementations may include one or more of the following features. The terminal where the information includes a transmit power table (TPT) including the TP values. The terminal where the uplink power control module is configured to lookup a recommended TP value for use as the terminal transmit power from the TPT table based on the sub-beam associated with the terminal and a transmit frequency. The terminal where the uplink power control module is configured to adjust the recommended TP value to account for a difference in a terminal amplifier power at the transmit frequency as compared to a center frequency of the respective frequency bin. The terminal where the uplink power control module is configured to adjust the recommended TP value based on a difference between the average forward SNR at the gateway and a forward SNR of the terminal. The terminal where the uplink power control module is configured to adjust the recommended TP value based on the confidence metric associated with the sub beam and the transmit frequency.

Additional features will be set forth in the description that follows, and in part will be apparent from the description, or may be learned by practice of what is described.

DRAWINGS

In order to describe the way the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 1 illustrates a terminal power control network system, according to various embodiments.

FIG. 2A and FIG. 2B illustrate a sub-division of a spot beam into sub-beams, according to various embodiments.

FIG. 3 illustrates a method of sub-dividing a sub-beam into frequency bins, according to various embodiments.

FIG. 4 illustrates a reduced variable set, according to various embodiments.

FIG. 5 illustrates a Transmit Power Table (TPT), according to various embodiments.

Figure 6:
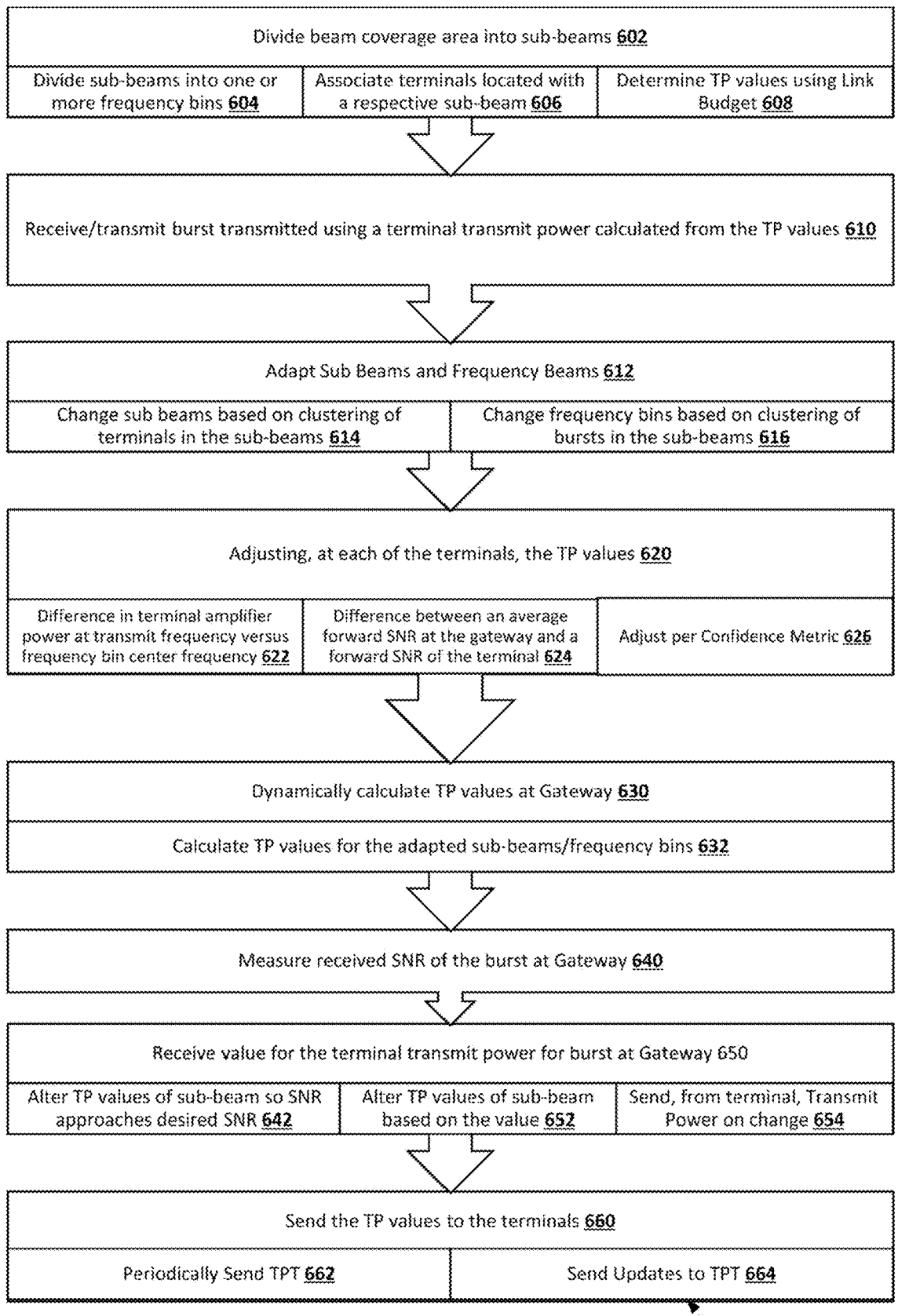
FIG. 6 illustrates a process for managing terminal uplink power, according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Embodiments are discussed in detail below. While specific implementations are discussed, this is done for illustration purposes only. A person skilled in the relevant art will recognize that other components and configurations may be used without parting from the spirit and scope of the subject matter of this disclosure.

The terminology used herein is for describing embodiments only and is not intended to be limiting of the present disclosure. As used herein, the singular forms "a," "an" and "the" are intended to include the plural forms as well, unless the context clearly indicates otherwise. Furthermore, the use of the terms "a," "an," etc. does not denote a limitation of quantity but rather denotes the presence of at least one of the referenced items. The use of the terms "first," "second," and the like does not imply any order, but they are included to either identify individual elements or to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Introduction

To achieve a constant packet error rate at the gateway, a constant received Signal to Noise Ratio (SNR) is required. Terminal uplink closed loop power control allows a constant SNR to be maintained with changing channel conditions by changing the transmit power of the terminal. The channel conditions change slowly enough due to rain and other atmospheric conditions such that a feedback from the gateway can be used to control the terminal power values.

Terminal Power Control Using Ranging

The prior art uses a 'Ranging' process where a terminal, from a cold start, searches for the transmit power required to achieve the required SNR at the gateway. It achieves this by transmitting several bursts, receiving the feedback from the gateway regarding the SNR and then using the feedback to adjust its power until a desired SNR is achieved. The power back off values are stored and the terminal uses them when it transmits.

Closed Loop Feedback

Due to the varying channel conditions, such as rain and other atmospheric conditions, using the power back off values evaluated during the ranging process may not result in achieving the desired SNR at the gateway. To mitigate any changes in ranged power values, feedback from the gateway about the received SNR is constantly used to adjust the transmit power. Two components help in attaining this goal, ULFE (Uplink fade estimator) adjustment and STF (system tracking filter) adjustment. The ULFE open loop component evaluates the change in forward SNR received at the terminal and estimates the change in the uplink power required and the STF uses the feedback from the gateway to adjust the terminal power. The STF helps in adjusting for any difference in power between the ULFE estimate and the actual power required.

Since the transmit power, channel conditions, system interference and gateway receive properties all vary with frequency, this process ideally is repeated for different channel frequencies where the terminal might be asked to transmit in a MF-TDMA system. The transmit properties of signals like EVM and ACI depend on the modulation, symbol rate and the amplifier being used. This tremendously increases the number of 'ranging' sessions required.

Each ranging session requires bandwidth allocation from the gateway to the terminal and a certain time for enough feedback from the gateway to arrive at the terminal such that the terminal can achieve the desired SNR. The total time for the complete session can take minutes.

Limitations of Closed Loop Feedback

The closed loop feedback system allows gradual changes in a gateway receive SNR to be tracked and adjustments to be made to the terminal power correspondingly. On the other hand, sudden changes in the SNR are not tracked well. In situations where the gateway receive SNR is so low that the burst cannot be demodulated, no feedback is sent, and the terminals cannot adjust their power. Although the ULFE helps in that regard, it is limited when the forward SNR does not change but the return SNR does. These situations arise in the normal operation of the system from multiple cases.

Move Between Different Inroutes—Change in Transmit Frequency

The system hardware performance and the atmospheric channel conditions are dependent on the frequency being used. For example, the amplifier output power varies substantially with frequency and correspondingly the received SNR at the gateway changes when the assigned operating frequency of the terminal is changed, resulting in performance degradation. If the change is substantially lower, the burst transmitted by the terminal might not be received by the gateway. The system interference also varies with frequency and at certain frequencies might be substantially different and cause the received SNR at the gateway to be different than the one desired.

Move Between Locations—Beam Handover/Satellite Handover

A change in the location of the terminal in a mobility-based environment causes the satellite to terminal link (downlink) characteristics to change continuously. Although most properties change gradually, when the terminal is moving between beams or satellites, the characteristics might change suddenly. This requires that the terminal re-range when changing beams or satellites, a time-consuming process that may affect traffic.

GW Diversity Switching

When a gateway diversity switch occurs, for example when the rain fade at the gateway is excessive, the satellite to gateway link changes suddenly, thereby changing the transmit power required at the terminal to achieve the desired SNR at the GW.

Proposed Solution

Transmit power values vary by location and transmission frequency. As such calculating and sending a transmit power value to each terminal within a beam's coverage area would require a lot of bandwidth. To counter this, a beam's coverage area is divided into smaller areas called sub-beams. In some embodiments, the available frequency spectrum (available return bandwidth) may be divided into frequency bins. The sub-beam and frequency bin evaluation by the gateway may determine the transmit power values within a narrow bound for a terminal within a frequency bin of a sub-beam.

FIG. 1 illustrates a terminal power control network system.

A terminal power control network system 100 may include a satellite 102, a gateway 104 and terminal 106. Communication from the gateway 104 to the terminal 106 is via a forward link (outroute) that includes an uplink 108 from the gateway 104 that is relayed by the satellite 102 as a downlink 108' to the terminal 106. Communication from the terminal 106 to the gateway 104 is via a return link (inroute) that includes an uplink 110 from the terminal 106 relayed by the satellite 102 as a downlink 110' to the gateway 104. The terminal 106 may include an uplink power control module 112 and a forward signal to noise ratio (SNR) feedback module 114. The gateway 104 may include a Return SNR measurement module 116, power control broadcast module 118 and power control calculator 120.

The uplink power control module 112 at the terminal 106 may maintain its own set of transmit power values for each of the various parameters that may be constantly tuned in line with the recommendations from the gateway 104. The uplink power control module 112 chooses the relevant sub-beam (based on its location) and frequency bin (based on desired transmit frequency spectrum) combination to access the transmit power recommendation sent by the gateway 104. These values may then be modified before using them to transmit, for example, to transmit bursts. The terminal 106 may also communicate the modified transmit power values to the gateway 104 via the forward SNR feedback module 114. The forward SNR feedback module 114 may provide the feedback to the gateway when the transmit power or attenuation values change.

At the gateway 104, the return SNR measurement module 116 measures the SNR of a signal received from the terminal 106. Different SNR values may be measured for the signal in each frequency bin. The return SNR measurement module 116 or the power control calculator 120 may determine the sub-beam and frequency bin associated with the signal. The measured SNR values may be recorded and associated with the combination of sub-beam and frequency bin. The power control calculator 120 may calculate the transmit power values in each frequency bin of each sub-beam. The calculated transmit power values drive the measured SNR values to desired values. These calculated transmit power values associated with the combination of sub-beam and frequency bin are then communicated to either some or all the terminals served. The communications of the power values may be to all the terminals associated with the gateway, the beam coverage area, the sub-beam coverage area, or the like by the power control broadcast module 118. As such, the number of transmit power values calculated and communicated for a beam are reduced drastically.

In some implementations, a feedback from the gateway 104 to each individual terminal 106 may be provided along with the values for each sub-beam and frequency bin. During startup or if the terminal 106 goes idle for a long time, the terminal 106 may revert to using the gateway 104 recommended values. Subsequently, an EsNo (energy per symbol to noise power spectral density) feedback from the gateway 104 for each burst may assist the terminal 106 in determining the exact transmit power parameters. As such, the terminal 106 may make minor adjustments to the gateway 104 transmit power values using, for example, information regarding a forward Signal to Noise Ratio (SNR) seen at the terminal and an amplifier frequency power curve.

Gateway Operation

FIG. 2A and FIG. 2B illustrate a sub-division of a spot beam into sub-beams, according to various embodiments.

The Gateway sends the transmit power values to be used by the terminals for transmitting such that a desired SNR at the gateway is maintained over various operating scenarios. This allows the burst and packet error rate on the return or Inroute channel to remain essentially constant as desired for many applications. The transmit power for each terminal may be different, for example, based on its location in the satellite beam, the atmospheric conditions, hardware configuration, system interference, the frequency being transmitted on, or the Symbol rate ModCod (SyModCod) combination used. In most satellite systems, it is commonplace to use one terminal hardware configuration across the whole spot beam. The difference in transmit power for different SyModCod are dependent primarily on the Gateway receiver performance for the different ModCods and the symbol rates and are known apriori.

The atmospheric conditions, system interference and the satellite antenna gain, and hence the satellite to terminal link quality are dependent on the location of the terminal inside a spot beam. For a small area in the spot beam, these values can be safely assumed to be constant. The atmospheric conditions that affect the link quality, such as rain, clouds or the like, are normally constant over a small area. In some embodiments, the spot beam area can be divided into tessellated sub-beams, each having essentially the same terminal satellite link power values anywhere within the area.

Two exemplary subdivisions of a spot beam into sub-beams are illustrated in FIGS. 2A and 2B. In FIG. 2A, a coverage area 202 of a beam may be divided into sub-beams SB1-SB11 with virtual intersecting straight lines with none of the sub-beam areas overlapping. In FIG. 2B, a beam 204 may be divided into sub-beams SB1-SB5 with overlapping curved shapes.

The sub-beams need not necessarily have the same size or shape. Each sub-beam may be defined by a center and a boundary definition (radius if the sub-beams are circles, vertices if polygons, distance to edge if squares, or the like) to allow determination of whether a terminal location is within a certain sub-beam. If the sub-beams are overlapping in nature, then a selection criterion, for example, distance of terminal from sub-beam center, may be used to choose between multiple sub-beams encompassing a terminal location.

In a Demand Assigned Multiple Access (DAMA) based Multiple Frequency Time Division Multiple Access (MF-TDMA) system, each terminal can transmit at a different assigned frequency. The performance of the various hardware components in the terminal, satellite and gateway is dependent on the frequency. In High Throughput Satellite (HTS) systems, the frequency spectrum of operation can span a few hundred Mega Hertz (MHz). This can result in a very different performance between the two ends of the transmit spectrum. However, for a small band of spectrum within the usable bandwidth, the performance can be assumed to be nearly constant across the spectrum. This might be different for different systems. Instead of calculating transmit power for every frequency channel, a sub band or frequency bin can be used that has a few frequency channels. Each bin's frequency range can be tailored to the system configuration and requirements.

An exemplary SNR table per sub beam is included below.

| Sub beam | Average Forward SNR (dB) |
|---|---|
| 1 | 10.2 |
| 2 | 11.1 |
| 3 | 8.5 |
| ... | |

FIG. 3 illustrates a method of sub-dividing a sub-beam into frequency bins, according to various embodiments.

A beam spectrum 302 and a beam spectrum 312 may be assigned from an available frequency spectrum 300. The beam spectrum 302 may include sub bands 312.1, 312.2, 312.3, 312.4. Each sub band may have different transmit power values. In some embodiments, the beam spectrum 302 and beam spectrum 312 may be of different sizes. In other embodiments, the beam spectrum 302 and beam spectrum 312 may be of the same size. The beam spectrum 302 may be spanned by frequency bins 304.1, 304.2 and 304.3. The beam spectrum 312 may be spanned by frequency bins 314.1 and 314.2. In some embodiments, the beam spectrum 302 and beam spectrum 312 may span the same number of frequency bins. In other embodiments, the beam spectrum 302 and beam spectrum 312 may span different number of frequency pins.

In a static frequency layout of inroute channels, the power back off values can be calculated for each inroute separately. When the inroute layout is dynamically reconfigured, then the same frequency might have a different inroute at different times. Using frequency bins reduces the set to a manageable level and may also allow the frequency channel layout to be dynamically changed during operation.

An exemplary frequency bin is shown below.

| Frequency Bin | Frequency Range start | Frequency range stop |
|---|---|---|
| 1 | 29500 MHz | 29520 MHz |
| 2 | 29520 MHz | 29545 MHz |
| ... | | |

The present teachings depend on calculating the TP values for a reduced set of parameters, transmit frequency, time and the area inside a spot beam.

FIG. 4 illustrates an exemplary reduced variable set that needs to be calculated.

FIG. 5 illustrates a Transmit Power Table (TPT), according to various embodiments.

The Transmit Power (TP) values for each satellite spot beam may be calculated at the gateway independently and may resemble the table of FIG. 5. The Transmit Power Table (TPT) may include values for each combination of frequency bin and sub-beam. The TPT may include a confidence metric that enables the terminal to decide how to use the information presented in the TPT. The confidence metric may be dependent on the standard deviation of the calculated transmit power and the number of terminals and frequency channels in the frequency bin. The confidence metric value may be a number in the range of 0 to 1 and a higher value may denote a higher confidence in the transmit power.

In some embodiments, the transmit power values can be substituted by transmit attenuation values. The transmit attenuation values may be the difference between the maximum transmit power and the transmit power required. Although the present teachings illustrate terminal power control showing transmit power values, other transmit power values such as transmit power attenuation or back off for the terminal amplifier may be included in the TPT.

Calculating the TPT

During system start or gateway commissioning, the TPT may be calculated using the link budget calculations. Models of system performance at various frequencies and locations in the beam can be used to calculate the exact transmit power that may be required for a terminal. This calculation can be done for each sub-beam and each frequency bin established in the TPT. Since the system interference and adjacent channel interference may change as the system is running, the TPT values may mirror those changing conditions. The estimation done by the link budget may generally not be very accurate and hence the confidence metric associated with the initial TPT values may be set to a low value. In some embodiments, the TPT values at the terminal may be set to zero, indicating to the terminals that these values were calculated by the link budgets.

As user terminals start to be commissioned in the network, valuable feedback about the transmit power used may be received by the gateway. Each terminal may indicate the transmit power it uses for every burst that it sends out. To minimize the overhead, the terminal may indicate only when a change in transmit power occurs and not every burst. The gateway may assume that the same transmit power has been used until another value is received. Each burst that the terminal transmits on a frequency channel might or might not operate on the same ModCod. A different transmit power value may be indicated to the gateway if the ModCod changes. As soon as the gateway starts receiving terminal power values, it may start recalculating the TPT for sub-beams and Frequency bins that it receives the bursts for.

The terminals may send their location to the gateway and the gateway may assign a sub-beam to the terminal. The sub-beam assignment is done by finding the sub-beam area covering the terminal's location. The assignment may not change during operation for fixed VSAT terminals unless the sub-beams change. For mobile terminals, the sub-beam assignment may happen every time the terminal moves into another sub-beam.

The gateway may receive the TP values from each terminal in a beam. Each of those values may be mapped to the inroute channel and reference location (f, ref_loc) of the terminal. For a period of a few inroute frames, the gateway may collect all the TP values reported by the various terminals on each inroute and segregate the values based on the reference location of the terminal.

An ideal TP value for a particular terminal at a certain time, SyModCod (symbol rate and modcod) and frequency channel that is required is denoted as TP_Ideal(terminal, $Freq_{ch}$, t, symodcod) and maybe different from the transmit power used by the terminal due to the various errors in the estimation, in the transmit power values, atmospheric scintillation and noise, or the like most of the errors can be modeled as random white processes. This is illustrated by the following equation $$TP(terminal, Freq_{ch}, t, SyModCod) = TP\_Ideal(terminal, Freq_{ch}, t, SyModCod) + errors + noise$$

The gateway may receive the power values used by the terminal and normalize the power values to the power values required for the reference SyModCod. The gateway may then add the difference between the desired SNR for the burst received and the received SNR to the TP value. This value may be the normalized transmit power $TP_{norm}$(terminal, $Freq_{ch}$, t)

$$TP_{norm}(terminal, Freq_{ch}, t) = TP(terminal, Freq_{ch}, t, SyModCod) + \frac{C}{N}(SyModCod_{ref}) - \frac{C}{N}(SyModCod) - SNR_{burst} + SNR_{desired}$$

Since each frequency channel is shared by the terminals in the beam in a MF TDMA system, the gateway may segregate the $TP_{norm}$ based on the sub-beam clusters associated thereto. As such, a separate TPT value may be calculated for each sub-beam cluster.

The gateway may calculate the average normalized transmit power from all the terminals in the time duration (epoch) belonging to the sub-beam cluster, k, in each frequency channel. This is done by adding all the normalized sample values of transmit power received from the various terminals in a sub-beam over the period, Ts. The time period, Ts maybe chosen such that the averaging removes any atmospheric scintillation and most of the random, measurement noise in the transmit power values.

$$AveTP_{norm}(subbeam_k, freqch_a, Ts) =$$

$$\frac{1}{Nbursts}\sum_{t=1}^{Ts}\sum_{term \in subbeam_k} TP_{norm}(\text{term}, freqch_a, t)$$

where Nbursts is the number of bursts received by the gateway in the time duration Ts from various terminals in sub-beam cluster, k in the inroute frequency channel, a.

An average across all the inroutes or frequency channels present in one frequency bin is then calculated as $$AveTP_{norm}(subbeam_k, FBin_j, Ts) =$$

$$\frac{1}{Nfreqch}\sum_{freqch_i \in Fbin_j} AveTP_{norm}(subbeam_k, freqch_i, Ts)$$

where Nfreqch is the number of inroute channels present in the frequency bin, $Fbin_j$.

An exponential moving average can be used to remove any rapid fluctuations in the computed values.

$$AveTP_{norm}(subbeam_k, Fbin_j) = \mu * AveTP_{norm}(subbeam_k, Fbin_j) +$$

$$(\mu - 1) * AveTP_{norm}(subbeam_k, Fbin_j, Ts)$$

$\mu$ is the smoothing coefficient

This value is the final transmit power included in the TPT and communicated to the terminals. If no values are received from the terminals in a certain frequency bin or sub-beam, then the values belonging to that set will not be updated.

The confidence metric may be calculated with the following equation, where the variance in the sample TP values with respect to the $AveTP_{norm}$ is integrated with the percentage of terminals and frequency bins whose information was made use during the above calculations.

$$Conf_{met}(subbeam_k, Fbin_j) = (Terminal_{percent} * Fbin_{percent}) *$$

$$\left(1 - \frac{1}{(Nbursts * TPmax^2)}\sum_{t=1}^{Ts}\sum_{term \in subbeam_k}\right.$$

$$\left.(TP_{norm}(\text{term}, freqch_a, t) - AveTP_{norm}(subbeam_k, Fbin_j))^2\right)$$

Where $Fbin_{percent} = \frac{1}{Fbin_j size}\sum_{freqch_i \in Fbin_j} freqch_i * freqch_i size$ and $Terminal_{percent} = \frac{term\_count}{NTotalterm\_subbeam_k}$ Average Forward SNR for the Sub-Beam The gateway may provide to the terminals an average of the forward Outroute signal to noise ratio (SNR) across the terminals of the sub-beam. The terminals along with the transmit power used may send the forward SNR at the terminal to the gateway. The gateway may calculate the average of this value across the terminals of the sub-beam over a period matching the TPT calculation period and then remove any fluctuations in the calculation using an exponential moving average. This average value may then be sent to the terminals, for example, one value for a sub-beam.

$$AveSNR(subbeam_k, Ts) = \frac{1}{Nbursts}\sum_{t=1}^{Ts}\sum_{term \in subbeam_k} ForwardSNR(\text{term}, t)$$

$$AveSNR(subbeam_k) =$$

$$\mu * AveSNR(subbeam_k) + (\mu - 1) * AveSNR(subbeam_k, Ts)$$

Communicating the TPT

The TPT, wholly or partially, may be sent periodically to the terminals. The periodicity of the broadcast may be the same as the periodicity of the calculation. The periodicity may be chosen such that the broadcast is not too frequent but allows the system to track any change in atmospheric conditions such as rain. A terminal in a beam may receive values for only its beam or sub-beam. To reduce the overhead, TPT for each sub-beam can be multicast to the terminals in that sub-beam. The TPT may not be communicated if there are no changes to the values.

The TPT may be ordered according to the sub-beam and the Frequency bins such that the terminals can determine which sub-beam and frequency bin value to use when transmitting. The sub-beams may be in an ascending order starting with sub-beam 1 and the frequency bins may be in an ascending order of frequency range. In some embodiments, only the TP values and the corresponding confidence metric may be broadcast to the respective terminals.

The gateway may send to all the terminals, the association of that terminal to a sub-beam in the beam. The gateway may also send to the terminal information on the frequency bins regarding the range of frequencies in each bin. The forward average SNR may be sent to the terminals in a different message. For each sub-beam, an average value may be computed and sent to the terminals in that sub-beam.

Each terminal looks up from the TPT, its recommended TP value depending on its sub beam and transmit frequency Sub-Beams and Frequency Bin Selection Initially each beam may be divided into a few sub-beams. The number of sub-beams, their centers and areas may be chosen such that the total number of sub-beams remains small and the TP variation across the sub-beam is kept to a minimum. As the number of terminals in a spot beam increases, the usage of only a few sub-beams might affect performance since the difference in TP between the terminals in a sub-beam might grow. This can happen, for example, when the sub-beam centers are not aligned with where the clusters of terminals get installed. To reduce the difference in TP, the sub-beam areas can be constantly adapted to get better performance. Clusters of a certain number of terminals in a beam can be used to define the area and center of a sub-beam. Every time the sub-beams are adapted, for example, when new ones are added or some are deleted, the terminal to sub-beam mapping or assignment is resent to the terminals.

The frequency bin size may be chosen such that the amount of variation across the frequency range of the bin is minimized and the number of bins is minimized. The amount of variation in certain frequency portions might be more than others. To counter this and keep the number of bins small, the bin sizes may be variable. The variation may be modeled as part of the initial calculation of TPT from the link budgets. This analysis may yield the initial bin sizes to minimize the variation. The bin sizes and the number of bins can also be adapted during operation in a manner like the adaption of sub-beams. For ease of operation the bin sizes and number may be kept the same for all sub-beams. In some embodiments, the bin sizes and numbers may be different for different beams.

Terminal Operation

The terminal may receive the TPT values from the gateway for the transmit power to use to transmit a burst. The TPT contains values for different frequency bins and different sub-beams. The TPT maybe organized in ascending order of sub-beam numbers and in ascending order of the frequencies. The terminal may choose the TP values belonging to its sub-beam. From the list of frequency bins, the terminal may select the bin that includes the frequency it is transmitting on.

This chosen TP value indicates the power required for a certain SyModCod which may be known apriori. The terminal may then adjust the chosen value to the transmit power required for the SyModCod being used.

$$TP(SyModCod_{curr}) = \\ TP(SyModCod_{ref}) + \frac{C}{N}(SyModCod_{curr}) - \frac{C}{N}(SyModCod_{ref})$$

where $\frac{C}{N}(SyModCod_{curr})$ and $\frac{C}{N}(SyModCod_{ref})$ are the desired Carrier to Noise ratios for the current and reference SyModCod respectively.

The terminal can also use the confidence metric provided with the TP values to decide whether the value should be used directly or not. If the confidence metric of the chosen TP value is low, the terminal may make a small positive adjustment to the chosen value such that the burst is transmitted with a slightly higher power. This increases the probability of the burst being received by the gateway. The adjustment may be chosen at random and its maximum value may be inversely proportional to the confidence metric.

The terminal may adjust a chosen TP value. An exemplary adjustment may be for the difference in the transmit power of the terminal amplifier at the transmit frequency as compared to the center of the frequency bin which is what the TPT value calculated by the gateway will correspond to. The terminal amplifier characteristics maybe well-known and the difference in amplifier gain can be used to adjust the power.

$$TP(SyModCod_{curr})=TP(SyModCod_{curr})+\Delta power_{amp} \\ (Freqbin_{center}, Freq_{transmit})$$

Another exemplary adjustment may be that the terminal may use the forward SNR information that the gateway sends out for each sub-beam. The forward SNR of the terminal may differ from the average SNR calculated by the gateway for the sub-beam due to a difference in the satellite terminal link. The terminal may scale this difference in SNR to an uplink value and add it to the transmit power required.

$$TP(SyModCod_{curr})=TP(SyModCod_{curr})+scalingFactor*(AveSNR(subbeam)-SNR_{Rx})$$

When the terminal transmits, it may convey the TP it used to transmit the burst and the gateway may then use to calculate the TPT.

Individual Terminal Feedback

In some embodiments, the gateway does not send individual feedback to the terminals. In other embodiments, the gateway may send individual feedback about the return Inroute SNR to each terminal along with the TPT.

Initially the terminal on startup may use the gateway provided values from the TPT. Once the terminal is active and is getting feedback from the gateway, the terminal may use the feedback provided by the gateway to adjust the initial TP values to better reflect the terminal's individual value. If the terminal stays idle for long, then the terminal may revert to the TPT values to transmit the bursts.

Process for Managing Terminal Uplink Power

FIG. 6 illustrates a process for managing terminal uplink power, according to various embodiments.

A process 600 for managing terminal uplink power may include operation 602 to divide beam coverage area into sub-beams (see FIG. 2A, 2B). The process 600 may include an operation 604 to divide the sub-beams into one or more frequency bins. The process 600 may include an operation 606 to associate the terminals located within a respective sub-beam with the respective sub-beam. The process 600 may include an operation 608 to determine TP values using Link Budget.

The process 600 may include an operation 610 to either receive (at the gateway) and/or transmit (from the terminal) a burst transmitted using a terminal transmit power calculated from the TP values. The process 600 may include an operation 612 to adapt sub beams and frequency beams to current system load distribution. The process 600 may include an operation 614 to change the sub beams based on a clustering of terminals in the sub-beams. The process 600 may include an operation 616 to change frequency bins based on a clustering of bursts in the sub-beams.

The process 600 may include an operation 620 to adjust, at each of the terminals, the TP values 620 for that terminal. The process 600 may include an operation 622, at each of the terminals, to adjust for a difference in a terminal amplifier power at a transmit frequency versus a frequency bin center frequency. The process 600 may include an operation 624, at each of the terminals, to adjust for a difference between an average forward SNR at the gateway and a forward SNR of the terminal. The process 600 may include an operation 626, at each of the terminals, to adjust the terminal power values based on the confidence metric for the sub beam and frequency bin combination to be used.

The process 600 may include an operation 630 to dynamically calculate TP values at a gateway. The process 600 may include an operation 632 to calculate the TP values for the adapted dynamic configuration of the sub-beams/frequency bins. The process 600 may include an operation 640 to measure a received SNR of the burst at the gateway. The process 600 may include an operation 642 to alter the TP values of the sub-beam such that a received SNR of a burst approaches a desired SNR.

The process 600 may include an operation 650 to receive a value for the terminal transmit power for a burst at a gateway. The process 600 may include an operation 652 to alter the TP values the of sub-beam based on the received value. The process 600 may include an operation 654 to a send, from the terminal, the transmit power value when it changes.

The process 600 may include an operation 660 to end the TP values to the terminals. The process 600 may include an operation 662 to periodically send the TPT to the terminals. In some embodiments, the process 600 may include an operation to send only changes or updates to the TPT to the terminals.

The present teachings may be a system, a method, and/or a computer program product at any possible technical detail level of integration. The computer program product may include a computer readable storage medium (or media)

having computer readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Although the subject matter has been described in language specific to structural features and/or methodological acts, it is to be understood that the subject matter in the appended claims is not necessarily limited to the specific features or acts described above. Rather, the specific features and acts described above are disclosed as example forms of implementing the claims. Other configurations of the described embodiments are part of the scope of this disclosure. Further, implementations consistent with the subject matter of this disclosure may have more or fewer acts than as described or may implement acts in a different order than as shown. Accordingly, the appended claims and their legal equivalents should only define the invention, rather than any specific examples given.

I claim:

1. A method for managing a terminal's uplink power, the method comprising:
    dividing, at a gateway, a beam coverage area into sub-beams and each of the sub-beams into one or more frequency bins;
    associating a sub-beam of the sub-beams with terminals located within the sub-beam;
    determining Transmit Power (TP) values comprising a confidence metric and a transmit power or attenuation for each of the one or more frequency bins of the sub-beam;
    sending, from the gateway, the TP values of the sub-beam to the terminals via a forward link; and
    receiving, at the gateway, a burst transmitted using a terminal transmit power calculated from the TP values of the sub-beam.

2. The method of claim 1, wherein the determining of the TP values is based on a link budget calculation for each of the one or more frequency bins.

3. The method of claim 1, further comprising adapting, based on a clustering of the terminals in the sub-beams, a count of the sub-beams and the sub-beams within the beam coverage area; and calculating the TP values for the adapted sub-beams.

4. The method of claim 1, further comprising adapting, based on a clustering of bursts in the one or more frequency bins, a count of the one or more frequency bins and a spectrum of each of the one or more frequency bins; and calculating the TP values for the adapted one or more frequency bins of the sub-beam.

5. The method of claim 1, wherein the sending comprises sending one or more of a frequency range of each of the one or more frequency bins, a sub-beam identifier, and an average forward Signal to Noise Ratio (SNR) value for the sub-beam.

6. The method of claim 1, further comprising adjusting, at each of the terminals, the TP values for a respective frequency bin to account for a difference in a terminal amplifier power at a transmit frequency as compared to a center frequency of the respective frequency bin.

7. The method of claim 1, further comprising adjusting, at a respective terminal, the TP values based on a difference between an average forward Signal to Noise Ratio (SNR) at the gateway and a forward SNR of the respective terminal.

8. The method of claim 1, further comprising adjusting, at each of the terminals, the TP values according to the confidence metric for each of the one or more frequency bins.

9. The method of claim 1, further comprising dynamically calculating the TP values of the sub-beam.

10. The method of claim 9, further comprising measuring a received Signal to Noise Ratio (SNR) of the burst, wherein the calculating alters the TP values of the sub-beam such that the received SNR approaches a desired SNR.

11. The method of claim 9, wherein the burst comprises a value for the terminal transmit power for a respective frequency bin from one of the terminals upon a change in the value, and the calculating alters the TP values of the sub-beam based on the value.

12. The method of claim 9, wherein the calculating of the TP values comprises one or more of normalizing, averaging or calculating an exponential moving average based on the value for one of the one or more frequency bins.

13. The method of claim 1, wherein the TP values of each of the terminals located within the sub-beam are essentially the same.

14. A system to manage a terminal uplink power, the system comprising:
    terminals; and
    a power control calculator module
        to divide a beam coverage area into sub-beams and each of the sub-beams' available frequency spectrum into one or more frequency bins,
        to associate a sub-beam of the sub-beams with the terminals located within the sub-beam, and to determine Transmit Power (TP) values comprising a confidence metric and a transmit power or attenuation for each of the one or more frequency bins of the sub-beam;

a power control broadcast module to send the TP values of the sub-beam to the terminals via a forward link; and a gateway to receive a burst transmitted from one of the terminals using a terminal transmit power calculated from the TP values of the sub-beam.

15. The system of claim 14, wherein the power control calculator module is configured to adapt, based on a clustering of the terminals in the sub-beams, a count of the sub-beams and the sub-beams within the beam coverage area, and is configured to calculate the TP values for the adapted sub-beams.

16. The system of claim 14, wherein the power control calculator module is configured to adapt, based on a clustering of bursts in the one or more frequency bins, a count of the one or more frequency bins and a spectrum of each of the one or more frequency bins, and is configured to calculate the TP values for the adapted one or more frequency bins of the sub-beam.

17. The system of claim 14, wherein the power control broadcast module sends one or more of a frequency range of each of the one or more frequency bins, a sub-beam identifier, and an average forward Signal to Noise Ratio (SNR) value for the sub-beam.

18. The system of claim 14, further comprising a Signal to Noise Ratio (SNR) measurement module to measure a received SNR of the burst, wherein the power control calculator module is configured to alter the TP values of the sub-beam such that the received SNR approaches a desired SNR.

19. The system of claim 14, further comprising a Signal to Noise Ratio (SNR) measurement module to measure a received SNR of the burst, wherein the power control calculator module is configured to alter the TP values of the sub-beam based on the terminal transmit power.

20. A terminal having uplink power managed by a gateway, the terminal comprising:
an uplink power control module
to receive, via a forward link, information comprising Transmit Power (TP) values comprising a confidence metric and a transmit power or attenuation for a sub-beam, frequency bins comprising a frequency range, the sub-beam associated with the terminal, and an average forward Signal to Noise Ratio (SNR) value at the gateway, and
to adjust, based on the information, a terminal transmit power calculated from the TP values of the sub-beam; and
a transmitter to transmit a burst via a return link to the gateway using the terminal transmit power calculated from the TP values of the sub-beam.

21. The terminal of claim 20, wherein
the information comprises a Transmit Power Table (TPT) comprising the TP values,
the uplink power control module is configured to lookup a recommended TP value for use as the terminal transmit power from the TPT table based on the sub-beam associated with the terminal and a transmit frequency,
the uplink power control module is configured to adjust the recommended TP value to account for a difference in a terminal amplifier power at the transmit frequency as compared to a center frequency of the respective frequency bin,
the uplink power control module is configured to adjust the recommended TP value based on a difference between the average forward SNR at the gateway and a forward SNR of the terminal, and
the uplink power control module is configured to adjust the recommended TP value based on the confidence metric associated with the sub beam and the transmit frequency.

* * * * *